(12) United States Patent
Burkhard et al.

(10) Patent No.: US 6,354,159 B2
(45) Date of Patent: *Mar. 12, 2002

(54) OVERLOAD PROTECTOR FOR A FORCE-MEASURING DEVICE, PARTICULARLY FOR A BALANCE

(75) Inventors: Hans-Rudolf Burkhard, Wila; Ferdinand Schneider, Winterthur, both of (CH)

(73) Assignee: Mettler-Toledo GmbH, Greifensee (CH)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/362,236

(22) Filed: Jul. 28, 1999

(30) Foreign Application Priority Data

Aug. 20, 1998 (DE) ........................................ 198 370 875

(51) Int. Cl.[7] .................................................. G01L 1/04
(52) U.S. Cl. ................................. 73/862.637; 73/862.53
(58) Field of Search ........................... 73/763, 768, 774, 73/788, 862.381, 862.51, 862.52, 862.53, 862.637; 177/151, 154, 210

(56) References Cited

U.S. PATENT DOCUMENTS

| 4,319,650 A | * | 3/1982 | Brendel .................. 177/156 |
| 4,338,825 A | * | 7/1982 | Amlani et al. ......... 73/862.382 |
| 4,361,199 A | * | 11/1982 | Ulicny ........................ 177/154 |
| 4,467,661 A | * | 8/1984 | Somal .................. 73/862.382 |
| 4,581,947 A | * | 4/1986 | Wulf et al. ............. 73/862.474 |
| 5,923,000 A |  | 7/1999 | Tschopp |
| 6,194,672 B1 | * | 2/2001 | Burkhard et al. ........... 177/210 |
| 6,232,567 B1 | * | 5/2001 | Bonino et al. .............. 177/210 |

FOREIGN PATENT DOCUMENTS

| DE | 283 30 345 | 2/1980 |
| DE | 41 19 734 | 12/1992 |
| DE | 295 14 793 | 12/1995 |
| DE | 297 08 886.6 | 7/1997 |

* cited by examiner

*Primary Examiner*—Max Noori
(74) *Attorney, Agent, or Firm*—Lawrence E. Laubscher, Sr.

(57) ABSTRACT

To protect a force-measuring device from being damaged by an overload, the load receiver (27) has a first part (56) that receives the force to be measured and a second part (57) that transfers the force to a measuring transducer. The two parts, together with two parallel guide members (58, 59) by which they are connected, are portions of a monolithic material block that are separated from each other by a material-free space (55) in the form of a thin linear cut. A pre-tensioned elastic element (78) urging the two parts (56, 57) into spring-loaded engagement is arranged inside a cavity of the second part (57).

18 Claims, 2 Drawing Sheets

OVERLOAD PROTECTOR FOR A FORCE-MEASURING DEVICE, PARTICULARLY FOR A BALANCE

REFERENCE TO RELATED APPLICATION

This application is a companion to the Bonino, et al., U.S. application Ser. No. 09/111,574 filed Jul. 8, 1998, and assigned to the same assignee as the present invention.

FIELD OF THE INVENTION

BACKGROUND OF THE INVENTION

The present invention concerns an overload protector for a force-measuring device, in particular a balance, comprising a load receiver that has two parts, the first of which serves to introduce the force to be measured into the force-measuring device. The second part, which serves to transfer the force to be measured to a measuring transducer, is connected to the first part in an arrangement resembling a parallelogram by two parallel guide members whose lengthwise direction runs transverse to the direction of the force introduction. The parallel guide members are rigid relative to their longitudinal direction and elastically flexible in the transverse direction. Formed on the first part and the second part, respectively, the overload protector has a first and a second engagement area by which the first part and the second part can be brought into an engagement that blocks their displacement relative to each other in the direction of the force introduction. The overload protector further comprises a pre-tensioned elastic element urging the two parts into spring-loaded contact opposing the force to be measured that is introduced into the first part.

The purpose of overload protectors of this kind, particularly in sensitive balances, is to protect the measuring transducer and the parts that serve to transfer the force to be measured to the measuring transducer against being overloaded by forces that significantly exceed those that occur at the specified nominal capacity load of the balance. Harmful force effects of this kind occur, for example, when through incorrect operation of the balance the load to be weighed is put on the weighing pan in an unduly abrupt manner. In this case, the instantaneous force acting on the load receiver will exceed the nominal capacity force. Even if a stationary stop is provided to limit the amount of travel of the load receiver in the direction of force introduction, the load receiver is nevertheless subjected to an excessive amount of acceleration up to the point where the motion comes to rest at the stationary stop. This gives rise to inertial forces of a corresponding magnitude in the measuring transducer as well as in the parts that serve to transmit the force to be measured; and/or it will cause transient peaks of tensile and compressive stress in the pivots and couplings, which the balance is not equipped to withstand, being designed for a given capacity load.

DESCRIPTION OF RELATED ARTS

In a known overload protector provided in a balance as described above at the outset (DE 28 30 345 C3), the two guide members of the overload protector are formed in a triangular or trapezoidal shape out of flat material stock and are attached with clamping bolts to the second part at the longer base side of the triangle or trapeze and to the first part at the opposing corner or shorter side of the triangle or trapeze, respectively. For the purpose of attaching the guide members, the second part on the side facing away from the first part is equipped with a console located at a distance from the second part and extending in the transverse direction relative to the two guide members. The main portion of the second part that supports the console extends through the material-free interior area of the triangle or trapeze that is delimited by the sheet material portions that form the guide members running along the sides of the triangle or trapeze that extend between the two parts. This geometry of the overload protector requires a relatively large amount of space. In addition, the cost of assembling the first part and the second part and the guide members with the clamping bolts is relatively high.

On the other hand, a particularly space-saving arrangement is known for a monolithic design (DE 41 19 734 A1) of the parts that serve to introduce and transfer the force to be measured to the measuring transducer. However, this does not include an overload protector for the load receiver.

SUMMARY OF THE INVENTION

The object of the present invention is to create an overload protector of the kind described above at the outset, combining an exceptionally space-saving design with a low assembly cost.

According to the invention, the solution for this problem is to design the two parts and the two guide members as integrally connected material portions of a monolithic material block in which the guide members are separated from each other by a material-free space that traverses the material block.

Because the two parts of the load receiver are connected through the guide members into a single integral part, the assembly labor for the inventive overload protector is reduced to the operation of inserting the pre-tensioned elastic element that urges the two parts into spring-loaded contact against each other. Furthermore, the volume taken up inside the material block by the material-free space separating the two parts and the two guide members from each other can be kept small and, consequently, the amount of space required for the overload protector will also be small. Economical manufacturing processes are available for forming the material-free space including, e.g., milling, drilling or spark erosion as well as a combination of these processes. Primarily the last-mentioned, spark erosion, proves to be particularly well suited.

As long as the pre-tensioned elastic element urges the two parts into spring-loaded contact against each other, the first part and the second part are rigidly coupled to each other, and the force introduced into the first part is transmitted by the second part and directed to the measuring transducer. On the other hand, if the force introduced into the first part exceeds the contact force corresponding to the pre-tension of the elastic element, the first part will be displaced and set into motion relative to the second part up to the point where the first part comes to rest against a stationary stop. However, the portion of the inertial forces that exceeds the amount of the pre-tension is not transmitted to the second part. Thus, the harmful inertial forces are prevented from reaching the measuring transducer and those other parts of the force-measuring device that serve to transmit the force. In this, the amount of pre-tension of the elastic element is selected in the appropriate magnitude to maintain the spring-loaded contact of the two parts up to the nominal capacity load of the balance.

In a further development of the invention, a practical solution is offered wherein the first engagement area is formed by a first shoulder in the material portion making up the first part and the second engagement area is formed by a second shoulder in the material portion making up the second part. Each of the shoulders projects towards the respective opposite material portion. The first shoulder has a free surface facing towards the first guide member, i.e., against the direction of the force to be measured, and the second shoulder has a free surface facing towards the second guide member, i.e., in the same direction as the force to be measured. The material portions forming the first part and the second part are pressed against each other at the free surfaces by the pre-tensioned elastic element. Given that on the one hand, the free surface of the shoulder of the second part faces in the direction of the force introduction, i.e., the surface vector of this free surface has the same direction as the force introduction, and on the other hand, the free surface of the shoulder of the first part faces in the direction against the force introduction, i.e., the surface vector of this free surface has the opposite direction of the force introduction, the force acting on the first part will have the tendency to separate the free surface of the shoulder of the first part from the free surface of the shoulder of the second part, whereby the first part is being displaced relative to the second part in the direction of the force introduction. However, this displacement occurs only when the applied force exceeds the pre-tension of the elastic element that urges the two free surfaces into compressive engagement in opposition to the applied force.

As a preferred feature, the shoulder of at least one of the two parts is designed to allow the shoulder to be displaced in relation to the part in the direction transverse to the force introduction.

As is known, the force to be measured that is acting on the load receiver also produces a torque causing an albeit ever so slight distortion of the load receiver. As an example, this problem, known as lengthwise-eccentric loading, has an increasingly stronger effect the more a weight is placed off-center on the weighing pan that is supported by the load receiver. The distortion caused by lengthwise-eccentric loading can cause a slight slippage of the mutually engaged shoulders of the first part and the second part relative to each other. This leads to a hysteresis error. With the shoulder being configured to be displaceable in the direction transverse to the force introduction on at least one of the two parts of the load receiver, the respective shoulder can follow the distortion caused by the eccentric loading, whereby the slippage at the engagement of the shoulders together with the associated hysteresis will be avoided. To accomplish this purpose, it is sufficient if one of the two shoulders of the first or the second part is configured to be displaceable in the transverse direction. However, it is also conceivable that both shoulders be configured to be displaceable in the transverse direction relative to the force introduction.

In an advantageous further development of the invention, the displaceable shoulder is formed in a material portion that is delimited by material-free spaces and connected to the part comprising the displaceable shoulder by a thin portion designed to bend elastically in the direction transverse to the force introduction. This configuration allows the displaceable shoulder to be formed on the respective part in a space-saving manner and without adding to the cost of assembly.

In addition, it has proven to be practical if the pre-tensioned elastic element is a pre-tensioned compression spring. The required amount of pre-tension of the compression spring is achieved by compressive deformation, thereby reducing the amount of space occupied by the spring.

In an advantageous embodiment of the invention, the compression spring is configured as a helix spring, one end of which pushes against a support surface located on the material portion forming the second part and facing against the direction of the force introduction. The other end of the helix spring pushes against the surface (the latter facing in the same direction as the force introduction) of a support shoulder of a bolt passing axially and with lateral play through the material portion of the second part and through the helix spring along the direction of the force introduction. The bolt is anchored in the first part and axially moveable relative to the second part against the pre-tensioning force of the compressive spring. According to this configuration, the bolt which is firmly connected to the first part and moveable relative to the material portion that forms the second part extends with lateral play inside the helix spring in the direction parallel to the force introduction. The purpose of the lateral play is to assure that the bolt does not obstruct the mobility of the first part in relation to the second part. The material portion that forms the second part contains the support surface facing against the direction of the force introduction that serves to hold one end of the helix spring and thereby pushes against that end of the compression spring in opposition to the applied force. Starting out from this support surface, the compression spring surrounds the shaft of the bolt with lateral play and extends to the support shoulder of the bolt that faces in the direction of the force introduction, i.e., opposes the support surface of the material portion forming the second part. When a force in excess of the nominal load capacity (as set by the degree of pre-tension in the compression spring) is introduced into the first part, the compression spring is being further compressed, causing the support shoulder of the bolt to move towards the support surface of the second part, in other words causing a displacement of the first part relative to the second part in the direction of the force introduction.

In the same context, a further development of the invention provides for a cavity inside the second part to enclose the circumference of the helix spring. This cavity may be produced in a simple manner in the form of a bore hole with the same axial direction as the force introduction that partially traverses the material portion forming the second part as well as the guide member adjoining the second part on the side from which the force is being introduced, in which case the bottom of the bore hole forming the cavity at the same time serves as the retaining surface for the helix screw.

In a further developed practical version, the cavity in the material portion forming the second part has a stop that limits the axial displacement of the bolt. This stop could, e.g., be provided by the bottom end of the blind hole that forms the cavity, with a gap between the bottom of the blind hole and the end portion of the bolt that points in the direction of the force introduction, thereby providing a displacement-stopping rest position for the end of the bolt. This stop limits the range of travel of the bolt in the absence of other restraints such as will be available after assembly of the force-measuring device, e.g., through the displacement-stopping contact of a balance pan support connected to the load receiver against a rest stop on the enclosure.

In a further practical design alternative, the end portion of the bolt that points in the direction of the force introduction protrudes out of the surface of the material block. After assembly, this protruding end portion can function together with an enclosure-based rest stop to provide a travel restraint.

In the same context, it is practical for the bolt to have a connector portion for receiving the force to be measured at the end of the bolt facing against the direction of the force introduction. In this case, the bolt guiding the helix spring at the same time serves the purpose of receiving the force that is to be introduced into the first part. For an application in a balance, the connector portion of the bolt preferably has the shape of a conical support peg on which the balance pan is seated.

In an advantageous spatial configuration of the preceding embodiments, the bolt is arranged in the portion of the load receiver that extends between the two guide members. The advantage lies in minimizing the required amount of space, given that the spatial dimension dictated by the guide members is at the same time used to accommodate the bolt.

Also preferred is a design where the material-free space is at least in part formed by only a thin linear cut traversing the material block. The width of the thin linear cut can be reduced to the minimum amount that is required to still allow a sufficient displacement of the first part relative to the second part in the case of an overload condition. Thin linear cuts of this kind can be produced primarily through the process of spark erosion with practically no limitations as to their shape. The thereby achievable cutting widths are as small as, e.g., a few tenths of a millimeter. Suitable raw materials for the material block are, e.g., aluminum alloys, but numerous other raw materials may also be considered including, e.g., steel alloys or composite materials.

Advantageous embodiments of the invention are distinguished by the fact that the two guide members on the sides that face each other are contoured by sections of the thin linear cut. A thin flexible portion is delimited at each end of each guide member between the linear cut section and the respective opposite, outward-facing side of the guide member. Thereby, a parallelogram mechanism is formed that guides the first part of the load receiver, the corners of the parallelogram being defined by the thin flexible portions.

In a further practical development of the aforementioned embodiments, the thin linear cut has a section starting at the end of the first shoulder nearer the first part and ending at the terminal segment of a section that delimits the first guide member near the end closer to the first part. The thin linear cut further has a section starting at the end of the first shoulder nearer the second part and ending at the terminal segment of a section which delimits the second guide member near the end closer to the first part. Thereby the sections of the thin linear cut extending from the shoulders towards the guide members, together with the shoulders that extend in the transverse direction relative to the force introduction, define the shape of the contours of the first part and the second part facing each other in a complementary manner such that in particular the material portion forming the second part extends between the two guide members towards the material portion that forms the first part. In this arrangement, the shoulders extending in the transverse direction relative to the force introduction are located in the area of the force transducer that extends roughly between the thin flexible portions of the guide members that are nearer to the first part. The elastic member that urges the two shoulders into mutual contact is arranged, e.g., next to the shoulders on the side of the load receiver that faces away from the first part.

In a special configuration of this arrangement, the sections of the thin linear cut that delimit the guide members are at least in part wider than the section that connects the sections delimiting the guide members. The widened portions are arranged such that they will allow an increased amount of displacement travel of the first part relative to the second part.

It is also within the scope of the invention that the material portion forming the second part is guided in parallel motion relative to a stationary part of the force-measuring device by two parallelogram guides that extend lengthwise in the direction transverse to the force introduction and are rigid in their longitudinal but elastically flexible in their transverse direction, each of the guide members being connected at one end to the material portion forming the second part and at the opposite end to the stationary part of the force-measuring device, and that the material portion forming the second part is coupled to a mechanism for transmitting the force to be measured to the transducer. As long as the nominal capacity load is not exceeded, the first part and the second part of the load receiver remain rigidly coupled to each other, so that the load receiver is guided in a translatory displacement in the direction of the force by the parallelogram guides. This translatory displacement, which is caused by the force or load to be measured and which can be an immeasurably small or virtual displacement, is transferred to the transmitting mechanism for the force to be measured and allows the latter to be transmitted to the measuring transducer. As the first part and the second part are uncoupled from each other when the nominal capacity load is exceeded, the force-transmitting mechanism as well as the measuring transducer are protected against excessive inertial forces.

A particularly advantageous embodiment that has been further developed in this regard is distinguished by the fact that the parallelogram guides and the stationary part are formed as material portions of a material block that are monolithically connected to the second part and are separated from each other by a material-free space that traverses the material block. Thereby the advantages of a monolithic construction are being realized not only with respect to the overload protector but also with respect to the guiding restraint of the load receiver that is required by the measurement process.

With preference, this embodiment is configured in such a manner that the parallelogram guides at their longitudinal terminations have flexible portions that are delimited by material-free spaces. Particularly practical is an arrangement where at least one of the material-free spaces delimiting a flexible portion is formed by a thin linear cut that opens to an outside border of the material block and from that open end forms a curve that tangentially approaches the longitudinal direction of the parallelogram guides.

In the further expanded configuration of this embodiment, the force-transmitting mechanism has at least one lever, one arm of which is coupled to the material portion forming the second part by a coupling member extending in the direction of the force introduction that is rigid in its lengthwise direction and elastically flexible in its transverse direction. The force to be measured, after it has been introduced to the load receiver, is reduced or increased by the at least one lever to a magnitude that is appropriate for the measuring transducer.

In this case again the advantages of monolithic construction are realized in that the coupling member and the lever are formed as integrally connected material portions bounded by material-free spaces in a material domain of the stationary part that reaches out into the space between the two parallelogram guides. Again with respect to minimizing the required spatial dimensions and increasing the strength of the parts of the force-measuring device that are subjected to the force to be measured, it is advantageous if the material-free spaces delimiting the coupling member and the lever are at least in part formed only by thin linear cuts dissecting the material block.

Finally, it is particular to the configuration of all of the inventive embodiments that the material block has essentially the shape of a rectangular block, of which the largest pair of surfaces extends in parallel to the lengthwise direction of the parallelogram guides. In this, the material-free spaces traverse the material block from one to the other of the two largest sides of the block in a direction parallel to one of the smaller boundary surfaces of the block, whereby a compact and overall block-shaped design configuration with no protruding parts is achieved.

Further distinctive features, details and advantages of the invention will become evident from the following description and from the drawing that is also being referred to for the disclosure of all details essential to the invention that are not expressly mentioned in the text.

DETAILED DESCRIPTION OF THE INVENTION

Figure 1:
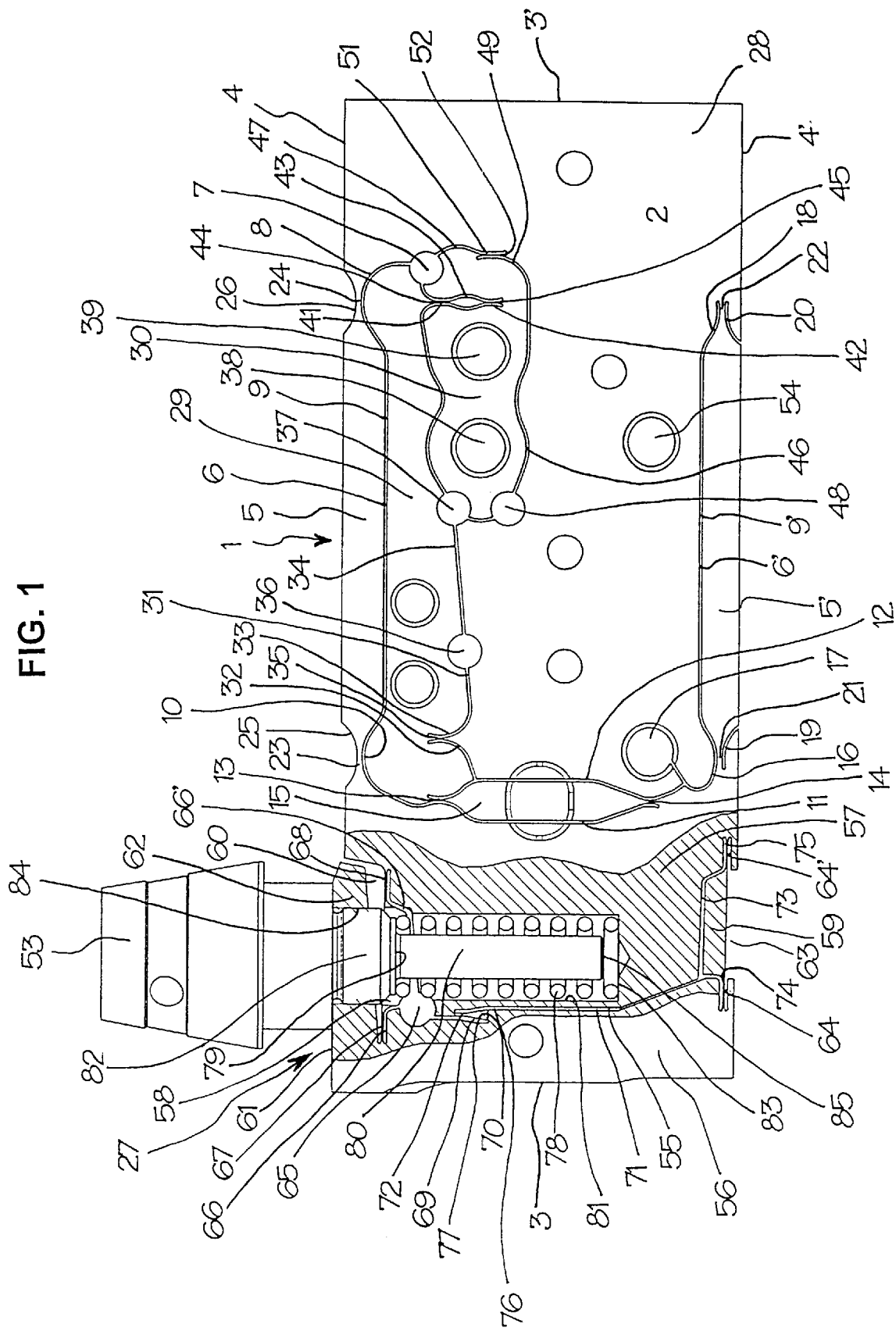
FIG. 1 represents a side view of a module of a force-measuring device with an overload protector.

FIG. 1 shows a plane view of a material block 1 in the shape of an essentially as seen from the direction of the largest side 2 of the rectangular block. A load receiver with an overload protector and other parts of a force-measuring device are formed in the material block 1. In particular, the force-measuring device represents a balance that serves to measure the weight force of a load that is to be weighed.

As shown in FIG. 1, the overload protection body or material block 1 is generally rectangular and includes a pair of longitudinal side walls 2, a pair of end walls 3, 3', and top and bottom walls 4 and 4', respectively.

The monolithic material block 1 is subdivided into several material portions that are separated from each other by material-free spaces within the material block 1. These material-free spaces traverse the material block at a right angle to the plane of the drawing from the largest side 2 that coincides with the plane of the drawing to the opposite largest side that lies at a distance behind the plane of the drawing. The two pairs of smaller side surfaces 3, 3' and 4, 4' of the material block extend between the two largest sides at a right angle to the plane of the drawing and form the outer boundary of the material block 1. The material-free spaces, for the most part, are formed by thin linear cuts with a width of, e.g., as little as a few tenths of a millimeter to several millimeters as measured in the direction parallel to the largest side surface 2. They are produced, for example, by the process of spark erosion by means of an erosion wire.

The two material portions identified with reference symbols 5, 5' extend along those respective smaller parallel side surfaces 4, 4' that are longer (as measured in the plane of the drawing) than the other pair of smaller parallel side surfaces 3, 3' running perpendicular to the side surfaces 4, 4'. At their interior boundaries that are facing away from the smaller side surfaces 4, 4', the material portions 5, 5' are delimited by the material-free spaces 6, 6' which, except for their end portions, run parallel to the smaller side surfaces 4, 4'.

Starting from a bore hole 7 that serves to insert the spark erosion wire, the material-free space has a terminal segment 8 with a convex curvature towards the smaller side surface 4 followed by a main section 9 running parallel to the smaller side surface 4. Following the main section 9, a terminal segment 10 is curved with the convex side facing the smaller side surface 4 and finally runs into a section 11 extending essentially parallel to the smaller side surface 3 that is perpendicular to the smaller side surface 4.

Running parallel to the smaller side surface 3 and to the section 11 that hangs together with the material-free space 6', a section 12 connects to the material-free space 6. At their terminations, the sections 11, 12 that are parallel to each other and to the smaller side surface 3 have curved segments with their convex sides facing each other, thereby delimiting two thin flexible portions 13, 14 that are connected to the material portion bounded by the two parallel sections 11, 12.

While the section 11 ends beyond the thin portion 14 and connects beyond the thin portion 13 with the curved terminal segment 10 of the material-free space 6, the section 12 ends beyond the thin portion 13 and connects beyond the thin portion 14 with a curved terminal segment 16 of the material-free space 6'. Starting from a bore hole 17 diagonally opposite the bore hole 7, this curved terminal segment 16 approaches the side surface 4' in a convex curve, continuing into the main section 9' of the material-free space 6' parallel to the smaller side surface 4', and ending in a terminal segment 18 opposite the terminal segment 16, again with a convex curvature towards the smaller side surface 4'. Opposite the convex-curved terminal segments 16, 18 of the material-free space 6', two material-free spaces 19, 20 form approximately a mirror-image of the convex-curved terminal segments 16, 18 relative to the longitudinal axis of the material portion 5' that runs parallel to the main section 9'. The terminal segments 19, 20 are formed by thin linear cuts starting from the smaller side surface 4' and delimiting between themselves and the terminal segments 16 and 18 at each end of the material portion 5' a thin flexible portion 21, 22. Likewise, the ends of the material portion 5 are shaped as thin flexible portions 23, 24 delimited on one side by the convex-curved terminal segment 8, 10 of the material-free space 6 and on the other side by the arcuate recesses 25, 26 that are formed in the material block 1 starting from the smaller side surface 4 and forming approximately a mirror-image of the convex-curved terminal segments 8, 10 of the material-free space 6 relative to the longitudinal central axis of the material portion 5.

The material portions 5, 5' form the parallelogram guides of a parallel-guiding mechanism by which the material portion 27 of the material block 1 that adjoins the material portion 15 and connects with the parallelogram guides 5, 5' through the two thin portions 21, 23 is guided in its displacement relative to the material portion 28 that connects to the parallelogram guides 5, 5' through the thin portions 22, 24 located at the opposite ends from the thin portions 21, 23, respectively. In this, the thin portions 21, 22, 23, 24 form the corners of the parallelogram where the parallelogram guides 5, 5' are flexible in transverse bending while being rigid in the longitudinal direction. The material portion 28 serves to mount the material block 1, e.g., on a stationary base plate of the balance, and thus represents a stationary part. In contrast to the stationary material portion 28, the material portion 27, being movable in parallel displacement due to the flexibility of the parallelogram guides, serves as load receiver of the balance. It is the material portion 27, that the force to be measured, i.e., the weight force in the case of a balance, is introduced to as will be described below.

The material portion 28 forming the stationary part has a region that projects into the space between the parallelogram guides 5, 5' and supports a lever system of two levers working in series that are formed of material portions 29, 30 of the material block 1 and are separated from each other by material-free spaces. On the side facing the parallelogram guide 5, the material portion 29 is delimited by the material-free space 6 which also delimits the parallelogram guide 5. The material-free space 31 that delimits the material portion 29 on the side facing away from the parallelogram guide 5, likewise, consists essentially of a sequence of sections of a thin linear cut. A first section 32 starts from the location where the section 12, delimiting the material portion 15 on the side nearest to the material portion 28, enters into its convex-curved segment delimiting the thin flexible portion 13, the first section 32 forming approximately a mirror image of the convex-curved segment. Opposite the first section 32 and curved like a mirror-image of section 32 runs a terminal segment 33 of a section 34, the latter running essentially in the longitudinal direction of the parallelogram guides 5, 5'. Delimited by the first section 32 and the terminal segment 33, a thin flexible portion 35 is aligned essentially with the thin flexible portion 13 relative to the longitudinal direction of the parallelogram guides 5, 5'.

Following the terminal segment 33, section 34 in detail continues in a straight line and, converging slightly towards the main section 6 of the material-free space 9, passes through a bore hole 36 and continues to a bore hole 37. Both bore holes may be used for inserting the spark erosion wire. Continuing from the bore hole 37, the section 34 curves around two bore holes 38, 39 of the material portion 30 that are lined up in the longitudinal direction of the parallelogram guides 5, 5'. Before reaching a first imaginary straight line running perpendicular to the parallelogram guides 5, 5' in the vicinity of the thin portions 22, 24, the section 34 forms a curve 41 whose convex side approaches the first imaginary straight line. Following the curve 41, the section 34 for a short distance runs in the direction of the first imaginary straight line and then forms a curved terminal segment 42, whose convex side again approaches the first imaginary straight line. Opposite the part of the section 34 that extends from the curve 41 to the curved terminal segment 42 and forming a mirror-image relative to the first imaginary straight line, a thin linear cut section 43 together with its mirror-image part of section 34 delimits two thin flexible portions 44, 45 lying on the first imaginary straight line.

The material portion 29 delimited by the material-free spaces 6 and 31 forms a lever that is supported on the material portion 28 by the thin flexible portion 35 forming the lever fulcrum. The material portion 15, being connected at one end through the thin flexible portion 13 to the end of the lever 29 that is closest to the load receiver 27 and at the opposite end through the thin flexible portion 14 to the load receiver 27, serves as coupling member between the load receiver 27 and the lever 29.

At the end farthest from the load receiver 27, the lever 29 is connected to the material portion 30 forming the secondary lever of the lever system through the thin portion 44, the material portion extending between the thin portions 44, 45, and through the thin portion 45.

The secondary lever formed by the material portion 30 is separated from the lever 29 by the part of section 34 that extends from the bore hole 37 to the terminal segment 42. The material-free spaces 46, 47 that, likewise, are formed by thin linear cuts delimit the material portion 30 that forms the second lever against the material portion 28. Starting from the bore hole 37, the material-free space 46 in detail runs perpendicular to the longitudinal direction of the parallelogram guides 5, 5' into a bore hole 48 from where it continues in the longitudinal direction of the parallelogram guides 5, 5' to a curved terminal segment 49 whose convex side approaches a second imaginary straight line running perpendicular to the parallelogram guides 5, 5'. This second imaginary straight line extends in the area of the material block 1 bordering on the first imaginary straight line that is defined by the thin portions 44, 45 and extending to the nearest smaller side surface 3'. The material-free space 47 has the form of a thin linear cut starting from the bore hole 7 and extending in the direction towards the convex-curved terminal segment 49 of the material-free space 46 where the material-free space 47 ends in a terminal segment 51 shaped as the mirror image of the terminal segment 49 relative to the second imaginary straight line. The terminal segments 49, 51 between themselves delimit a thin flexible portion 52 where the secondary lever 30 has its support fulcrum on the material portion 28.

By this arrangement, the force to be measured, being introduced in the direction perpendicular to the parallelogram guides 5, 5' into a conical support peg 53 for a weighing pan carrier (not shown), is coupled to the lever 29 by the coupling member 15 that extends parallel to the direction of the force introduction. The lever 29, in turn, is coupled to the secondary lever 30 by the material portion that extends between the thin portions 44, 45. Coupled to the secondary lever 30, e.g., by means of force-transmitting members (not shown) attached to the bore holes 38, 39 of the secondary lever 30, is a measuring transducer (not shown) receiving the force to be measured after it has been reduced by the levers 29, 30. The measuring transducer, which delivers a measuring signal corresponding to the magnitude of the force to be measured, can be supported, e.g., by mounting support parts (not shown) that are anchored in the stationary part 28 by means of the bore hole 17 and a further bore hole 54.

The load receiver 27 is divided by a material-free space 55 traversing the material block 1 into a first part 56 and a second part 57 where the material portion forming the second part 57 is connected through the thin portions 21, 23 to the material portions 5, 5' forming the parallelogram guides and through the thin portion 14 to the material portion forming the coupling member 15. The material-free space 55 that is formed for the most part by a thin linear cut further delimits two mutually parallel guide members 58, 59 by which the first part 56 and the second part 57 are connected to each other in the manner of a parallelogram linkage. On the side facing away from the guide member 59, the guide member 58 is delimited by a material-free domain 60 belonging to the material-free space 55, getting progressively wider over the distance from the first part 56 to the second part 57 and then continuing to the smaller side surface 4 nearest to the guide member 58, where the material-free domain 60 opens to the outside of the material block 1. Thus, the material-free domain 60 cuts off a surface portion 61 of the smaller side surface 4 and thereby delimits between itself and the surface portion 61 a load-receiving portion 62 that overhangs the second part 57 and from which the support peg 53 projects upwards. On the side facing away from the guide member 58, the guide member 59 is delimited by a shallow recess 63, which is formed on the smaller side surface 4' of the material block 1 that faces away from the support peg 53 and next to the end portions of the guide member 59 continues into thin linear cuts 64, 64' extending along the smaller side surface' 4'.

Adjacent to the guide member 58 delimited by the progressively widening material-free domain 60, on the side facing towards the guide member 59 and close to the end of the guide member 58 nearest to the first part 56, a bore hole 65 traversing the portions of the first part 56 and the second part 57 bordering on each other in that area is provided for the purpose of inserting the spark erosion wire. Starting from the bore hole 65, a thin linear cut 66 approaches and runs close to the narrow end of the progressively widening material-free domain 60, while another thin linear cut 66' starts out in the lengthwise direction of the guide member 58 towards the end closest to the second part 57 and in the vicinity of that end also approaches and runs close to the progressively widening material-free domain 60. Thus, the linear cut sections 66, 66' between themselves and the side of the guide member 58 that faces away from the guide member 59 delimit thin flexible portions 67, 68 at either end of the guide member 58.

Starting from the bore hole 65, another thin linear cut section 69 of the material-free space 55 extends essentially in the direction of the force introduction until it reaches a short linear cut section 70 running transverse to the direction of the force introduction. At the end farthest from the linear cut section 69, the linear cut section 70 opens into a thin linear cut section 71 of the material-free space 55 extending essentially in the direction of the force introduction. On one side of the juncture with the thin linear cut section 70, the thin linear cut section 71 has a branch extending in the direction towards the guide member 58 and delimiting between its terminal portion and the linear cut section 69 a thin portion 72 that is flexible in the direction transverse to the force introduction.

On the other side of the juncture with the thin linear cut section 70, the thin linear cut section 71 has a branch extending in the direction towards the guide member 59 that is farther from the support peg 53, running at first parallel to the direction of the force introduction for part of the way, then at an angle towards the second part 57, to meet a thin linear cut section 73 delimiting the guide member 59 on the side facing the guide member 58, where the thin linear cut section 71 opens into the section 73 near the end of the guide member 59 that is closest to the first part 56. Near the end portions of the guide member 59, the linear cut section 73 running in the lengthwise direction of the guide member 59 approaches and runs close to the thin linear cut section 64, 64' of the shallow recess 63, whereby in these locations two thin flexible portions 74, 75 are defined in the end portions of the guide member 59 between the thin linear cut section 64, 64' and the terminal segments of the linear cut section 73.

Over a portion closer to the first part 56, both of the linear cut sections 66' and 73 are wider than the width of the thin linear cuts 55 in the rest of the material-free space 55. The widening of the linear cut sections 66', 73 can either be parallel or have a widening taper in the direction towards the smaller side surface 3.

On the side closer to the support peg 53, the linear cut section 70 running between the linear cut sections 69 and 71 perpendicular to the direction of the force introduction delimits in the material portion 57 forming the second part a second shoulder 76 that projects towards the material portion forming the first part 56 and whose free surface faces in the same direction as the force introduction. At the same time, on the side closer to the guide member 59, the linear cut section 70 delimits in the material portion 56 forming the first part a first shoulder 77 that projects towards the material portion forming the second part 57 and whose free surface faces in the direction opposing the force introduction.

The first shoulder 77 and second shoulder 76 serve as engagement areas, their free surfaces being urged into compressive contact by a pre-tensioned elastic element in the form of a pre-tensioned compression spring 78 shown in the drawing as a helix spring. The end of the helix spring 78 facing against the direction from the force introduction, i.e., the end nearer the support peg 53, is retained by an opposite-facing support shoulder 79 of a bolt 80 inside a blind hole extending in the same direction as the force introduction inside the material block 1 in the area of the guide members 58, 59. This blind hole traverses the load-receiving portion 62 of the material portion that forms the first part, passes through the guide member 58 that is next to the load-receiving portion 62, and continues into an adjacent part of the material portion forming the second part 57, thereby forming a radially enclosed cavity 81 of sufficient diameter to accommodate and leave radial clearance for the compression spring 78 and a portion containing the support shoulder 79 on the head 82 of the bolt 80. The bottom of the cavity 81 located in the second part at an axial distance from the guide member 59 forms a support surface 83 facing against the direction of the force introduction to retain the end of the helix spring 78 pointing in the direction of the force introduction. In the part passing through the guide member 58 and the load-receiving portion 62, the diameter of the blind hole is a step wider than the cavity 81 in order to accommodate the head of the bolt 80. Within the load-receiving portion 62, the blind hole takes the form of a threaded hole 84 that matches the likewise threaded head 82 of the bolt 80, which is thereby rigidly anchored in the first part 56.

The end 85 of the bolt 80 that points in the direction of the force introduction is facing at a small axial distance the bottom surface of the cavity 81 that serves as support surface 83. This limits the amount of axial travel of the bolt 80 and thus the amount of displacement of the first part 56 relative to the second part 57 in the direction of the force introduction.

At the opposite end of the bolt 80 the bolt head 82 protrudes from the material block 1 and supports the conical support peg 53 that carries the weighing pan of the balance. In this manner, the force to be measured is transmitted though the bolt 80 into the first part 56 of the load receiver 27. Because the pre-tensioned compression spring 78 holds the first part 56 in compressive engagement with the second part 57, the force to be measured is transferred to the second part. However, if the applied force exceeds the pre-tension of the compression spring 78, the excess amount of force is not transferred to the second part 57. Instead, the first part 56 will move relative to the second part 57 until the weighing pan comes to rest on a fixed rest stop on the balance enclosure (not shown).

Given that the material portion containing the second shoulder 76 within the material portion forming the second part 57 is delimited by the branch of the thin linear cut section 71 leading to the thin portion 72 and hangs together with the second part 57 only through this thin portion 72, the engagement area formed by the second shoulder 76 is displaceable in the transverse direction relative to the force introduction. Thus, the engagement area can flexibly follow the transverse movements of the two parts 56, 57 that are caused by eccentric loading.

Figure 2:
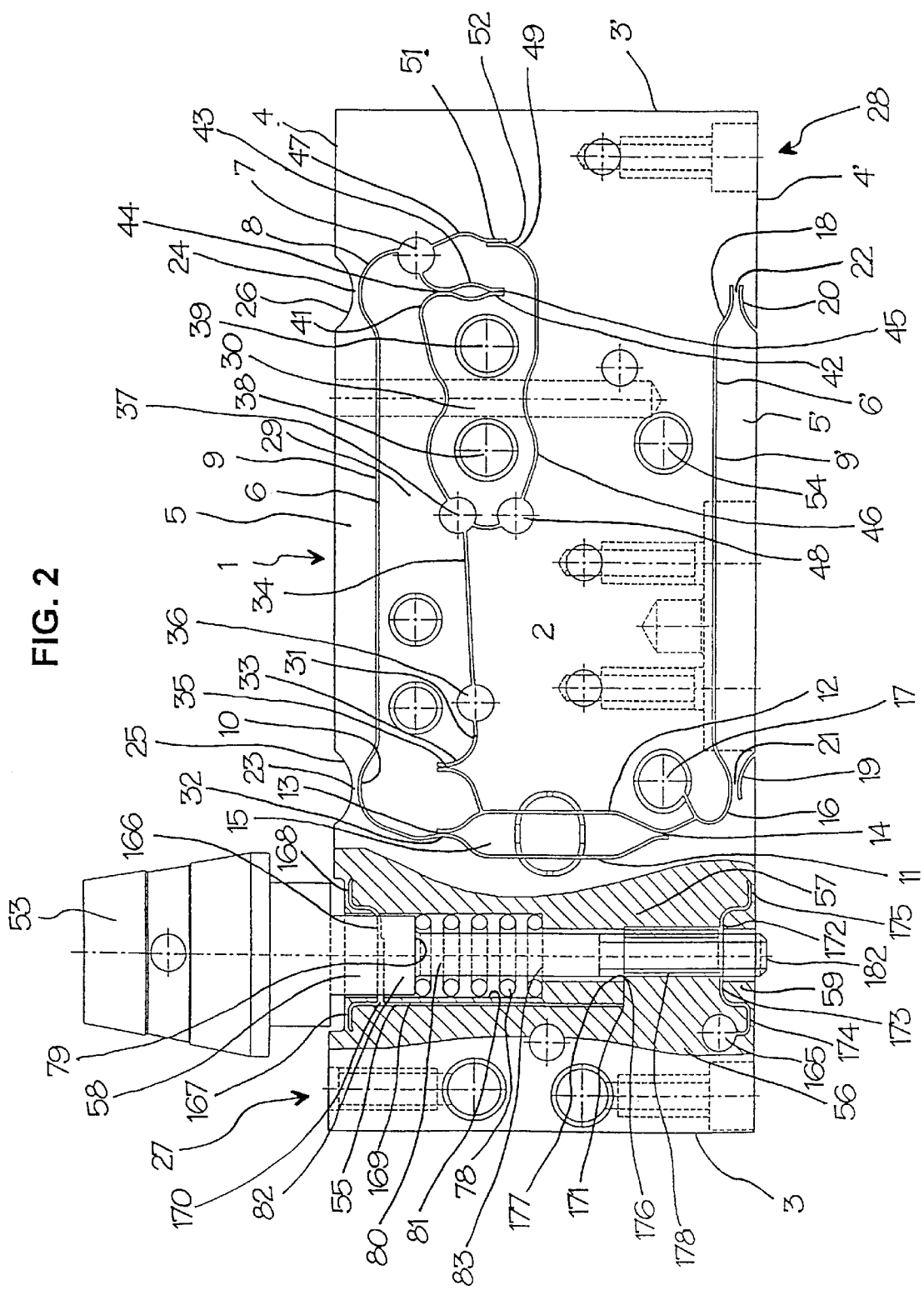
FIG. 2 represents a side view of an embodiment that has been simplified in comparison to the embodiment of FIG. 1.

FIG. 2 shows a simplified embodiment that does not have the transverse-elastic flexibility in the engagement area between the first part and the second part of the load receiver as provided in the embodiment of FIG. 1. Otherwise, the embodiment of FIG. 2 is for the most part identical with the embodiment of FIG. 1. Insofar as the parts in FIG. 2 are identical with FIG. 1, they are identified with the same symbols and are not described again. In this respect, the description of FIG. 1 also refers to the identical parts in FIG. 2.

Deviating from FIG. 1, the bore hole 165 in FIG. 2 for the insertion of the spark erosion wire is arranged in the vicinity of the guide member 59 that is located on the opposite side from the support peg 53. Starting from the bore hole 165, a thin linear cut section 173 of the material-free space 55 closely approaches and then parallels the outer border of the material block 1 at the smaller side surface 4' for a short distance in the direction towards the second part 57, whereby the linear cut section 173, together with the outer border of the material block 1 at the smaller side surface 4', delimits a thin flexible portion 174 at the end of the guide member 59. The next segment of the linear cut section 173 turns away from the smaller side surface 4', then once more follows the lengthwise direction of the guide member 59 which is delimited between the linear cut section 173 and the smaller side surface 4'. At the opposite end from the bore hole 165, the thin linear cut again turns towards the smaller side surface 4', then parallels the latter and thereby forms at this end of the guide member 59 a thin portion 175 corresponding to the thin portion 174. Forming a mirror image of the linear cut section 173 relative to a plane that runs parallel and equidistant to the smaller side surfaces 4, 4', a thin linear cut section 166 of the material-free space 55 delimits between itself and the smaller side surface 4 carrying the support peg 53 the upper guide member 58 with the thin portions 167, 168 corresponding to the thin portions 174, 175, respectively.

The material-free space 55 further contains a linear cut section 169 that connects the linear cut sections 166 and 173. Starting from the location 170, where the linear cut section 166 that delimits the guide member 58 turns away from its course that parallels the lengthwise direction of the guide member 58 and continues towards the thin portion 167 bordering on the first part 56, the thin linear cut section 169 extends in the direction of the force introduction for a stretch, but before reaching the linear cut section 173 that delimits the guide member 59, the linear cut section 169 changes direction to run transverse to the direction of the force introduction over a section 171 of about the same length as the guide members 58, 59, measured in the lengthwise direction between the flexible portions 167, 168 and 174, 175, respectively. Following the section 171, the linear cut section 169 once more runs in the direction of the force introduction and finally at the location 172 joins the linear cut section 173, where the latter turns away from its course that parallels the lengthwise direction of the guide member 59 and continues towards the thin portion 175 bordering on the second part 57. Thus, on the side facing towards the guide member 58 the section 171 delimits the second shoulder 176 serving as engagement area of the second part 57, and on the side facing towards the guide member 59 the section 171 delimits the first shoulder 177 serving as engagement area of the first part 56.

In place of the blind hole of the embodiment of FIG. 1, the embodiment of FIG. 2 has a hole that extends all the way through the material block 1 and whose diameter changes in steps as it traverses the guide member 58 and the adjacent parts of the material portion containing the second part 57 where a cavity 81 is formed to receive the compression spring 78. At the end of the cavity 81 that is closer to the guide member 59, the diameter of the bore hole is stepped down sufficiently to form the support surface 83 that retains the compression spring 78 while allowing the bolt 80 to pass through the hole with radial play. Subsequently, the further stepped-down bore hole traverses the material portion forming the first part 56 from its shoulder 177 to the thin linear cut section 173 that separates the guide member 59 from the first part 56. This segment of the bore hole has the form of a threaded hole 178 where the bolt 80, being provided with a matching thread, is firmly anchored in the first part.

The continuation of the multi-step bore hole passes through the guide member 59 that borders on the thin linear cut section 173. In this area, the end portion 182 of the bolt 80 that points in the same direction as the force introduction traverses the guide member 59 with play and projects beyond the surface of the material block 1. Opposite the end portion 182 and leaving a small gap in the axial direction, the balance is provided with a stationary rest stop (not shown) that limits the displacement travel of the load receiver 27 in the direction of the force introduction.

The drawing shows additional bore holes that so far have not been explained, some running parallel and some transverse to the plane of the drawing. A part of these bore holes serves only for the purpose of holding the material block 1 during the spark erosion process; another part may serve to mount the stationary part 28 on a stationary base plate of the balance; and yet another part may be used to attach further components of the force-measuring device. A detailed description of these bore holes is deemed to be dispensable, because it is unnecessary for an understanding of the invention.

What is claimed is:
1. Overload protection means for the load receiving means of a force-measuring device, comprising:
 (a) an integral monolithic generally rectangular body containing a plurality of material removed portions that define in said body:
  (1) a first body portion (56);
  (2) a second body portion (57) horizontally arranged relative to said first body portion; and
  (3) first parallelogram guide means (58, 59) guiding said first body portion for parallel displacement in the vertical direction relative to said second body portion;
 (b) means (53, 82, 84; 178) applying to said first body portion a load force that is to be measured:
 (c) resilient means (78) opposing downward displacement of said first portion by said load force relative to said second body portion;
 (d) said first and second body portions of said monolithic body including cooperating integral shoulder means (76, 77; 176, 177) for limiting the upward displacement of said first body portion relative to said second body portion; and
 (e) second guide means for guiding said second body portion for parallel displacement relative to a stationary portion (28) of said force measuring device, said second guide means including a pair of parallelogram guides (5, 5') that extend lengthwise in the direction transverse to the force to be measured and are rigid in their longitudinal direction, each of said parallelogram guides being connected at one end with said second body portion and at the opposite end to said stationary portion of the force-measuring device; and means coupled with said second body portion and supported by said stationary portion for transmitting the force to be measured to a force measuring transducer.
2. Overload protection means as defined in claim 1, wherein said parallelogram guides of said second guide means are formed in said monolithic rectangular body.
3. Overload protection means as defined in claim 1, wherein said monolithic rectangular body includes flexible portions (21, 22, 23, 24) connecting said parallelogram guides of said second guide means with said monolithic rectangular body.

4. Overload protection means as defined in claim 3, wherein said rectangular body contains a cut that opens to an outside border of said rectangular body and forms a curve that tangentially approaches the longitudinal direction of the parallelogram guides.

5. Overload protection means as defined in claim 1, wherein said force-transmitting means includes at least one lever having an arm coupled to the second body portion by a coupling member that extends in the direction of the force to be measured and is rigid in the longitudinal direction and elastically flexible in the transverse direction.

6. Overload protection means as defined in claim 5, wherein said coupling member and said lever are formed as integrally connected material portions bounded by material removed portions contained in the stationary portion of said rectangular body that extends into the space between said parallelogram guides.

7. Overload protection means as defined in claim 6, wherein said material removed portions comprise thin linear cuts dissecting said rectangular body.

8. Overload protection means as defined in claim 1, wherein said first and second parallelogram guide means extend longitudinally of said rectangular body.

9. Overload protection means for the load receiving means of a force-measuring device, comprising:
 (a) an integral monolithic generally rectangular body containing a plurality of material removed portions that define in said body:
  (1) a first body portion (56);
  (2) a second body portion (57) horizontally arranged relative to said first body portion; and
  (3) first parallelogram guide means (58, 59) guiding said first movable body portion for parallel displacement in the vertical direction relative to said second body portion;
 (b) means (53, 82, 84; 178) applying to said first body portion a load force that is to be measured; and
 (c) resilient means (78) opposing downward displacement of said first portion by said load force relative to said second body portion;
 (d) said first and second body portions of said monolithic body including intergal cooperating shoulder means (76, 77; 176, 177) for limiting the upward displacement of said first body portion relative to said second body portion said shoulder means defining a pair of shoulders (76, 77; 176, 177) integral with said first and second body portions, respectively, said shoulders having cooperating surfaces that are horizontal and are contained between said first parallelogram guide means in spaced relation relative to said resilient means.

10. Overload protection means as defined in claim 9, and further including means (72) connecting at least one of said shoulders (76) with its associated body portion for transverse displacement relative to the other shoulder.

11. Overload protection means as defined in claim 10, wherein said one shoulder is defined in said rectangular body by a material removed portion (71), said one body shoulder portion being connected with its associated body portion by a flexible connection (72) that bends elastically in the direction normal to the direction of the load force to be measured.

12. Overload protection means as defined in claim 9, wherein said resilient means comprises a compression spring.

13. Overload protection means as defined in claim 12, wherein said compression spring is a helical spring arranged in a vertical cavity (81) contained in the upper surface of said second body portion; and further including a vertically arranged load receiving bolt (80) connected with said first body portion and extending concentrically within said helical spring, said spring reacting between a shoulder (79) on said bolt and the bottom wall (83) of said cavity to bias said first body portion upwardly relative to said second body portion, said integral shoulders being spaced from said vertical cavity.

14. Overload protection means as defined in claim 13, wherein said cavity includes stop means (83) limiting the axial displacement of said bolt.

15. Overload protection means as defined in claim 13, wherein the lower end of said bolt extends through a through bore (178) contained in said second body portion in communication with said cavity, the lowermost extremity of said bolt protruding outwardly of said second body portion for engagement with fixed stop means arranged externally of said second body portion.

16. Overload protection means as defined in claim 13, and further including a load receiving peg (53) mounted on the upper end of said bolt.

17. Overload protection means as defined in claim 16, wherein said bolt extends through a vertical through bore contained in a component (58) of said first parallelogram guide means.

18. Overload protection means as defined in claim 9, wherein said first parallelogram means include guide members (58, 59) having flexible portions (167, 168; 174, 175) at their ends that are connected with said first and second body portions, respectively.

* * * * *